United States Patent [19]
Seekins

[11] 3,739,262
[45] June 12, 1973

[54] INSPECTION MACHINE USING A MASTER AND FOLLOWER TO GUIDE A PROBE AT A PREDETERMINED ANGLE RELATIVE TO A TEST PIECE

[75] Inventor: Harold L. Seekins, Cincinnati, Ohio
[73] Assignee: General Electric Company, Lynn, Mass.
[22] Filed: Sept. 20, 1971
[21] Appl. No.: 182,025

[52] U.S. Cl. .................. 324/40, 33/23 H, 33/174 L
[51] Int. Cl. ............................................. G01r 33/12
[58] Field of Search ..................... 324/34 R, 37, 40; 33/23 R, 23 E, 23 F, 23 H, 174 L

[56] References Cited
UNITED STATES PATENTS
| | | | |
|---|---|---|---|
| 1,080,347 | 12/1913 | Johnson | 33/23 F |
| 1,874,067 | 8/1932 | Sperry et al. | 324/37 |
| 2,433,421 | 12/1947 | Bowness | 33/174 L |
| 3,588,683 | 6/1971 | Lloyd | 324/37 |

Primary Examiner—Robert J. Corcoran
Attorney—Frank L. Neuhauser and Edward S. Roman et al.

[57] ABSTRACT

An eddy current inspection machine comprises a blade master and a plurality of blade holders mounted in side-by-side relation on a carriage which reciprocates in a horizontal $x$ direction. Probes and a follower are mounted on a parallel linkage mechanism which is pivotally mounted on a slide which is incrementally advanced in a horizontal $y$ direction. The follower engages the master and controls the angular setting of the parallel linkage mechanism to position the probes normal to the surfaces of blades positioned by the holders. Read-out means, connected to the probes, identify imperfection as the probes traverse the surfaces of the workpieces.

11 Claims, 4 Drawing Figures

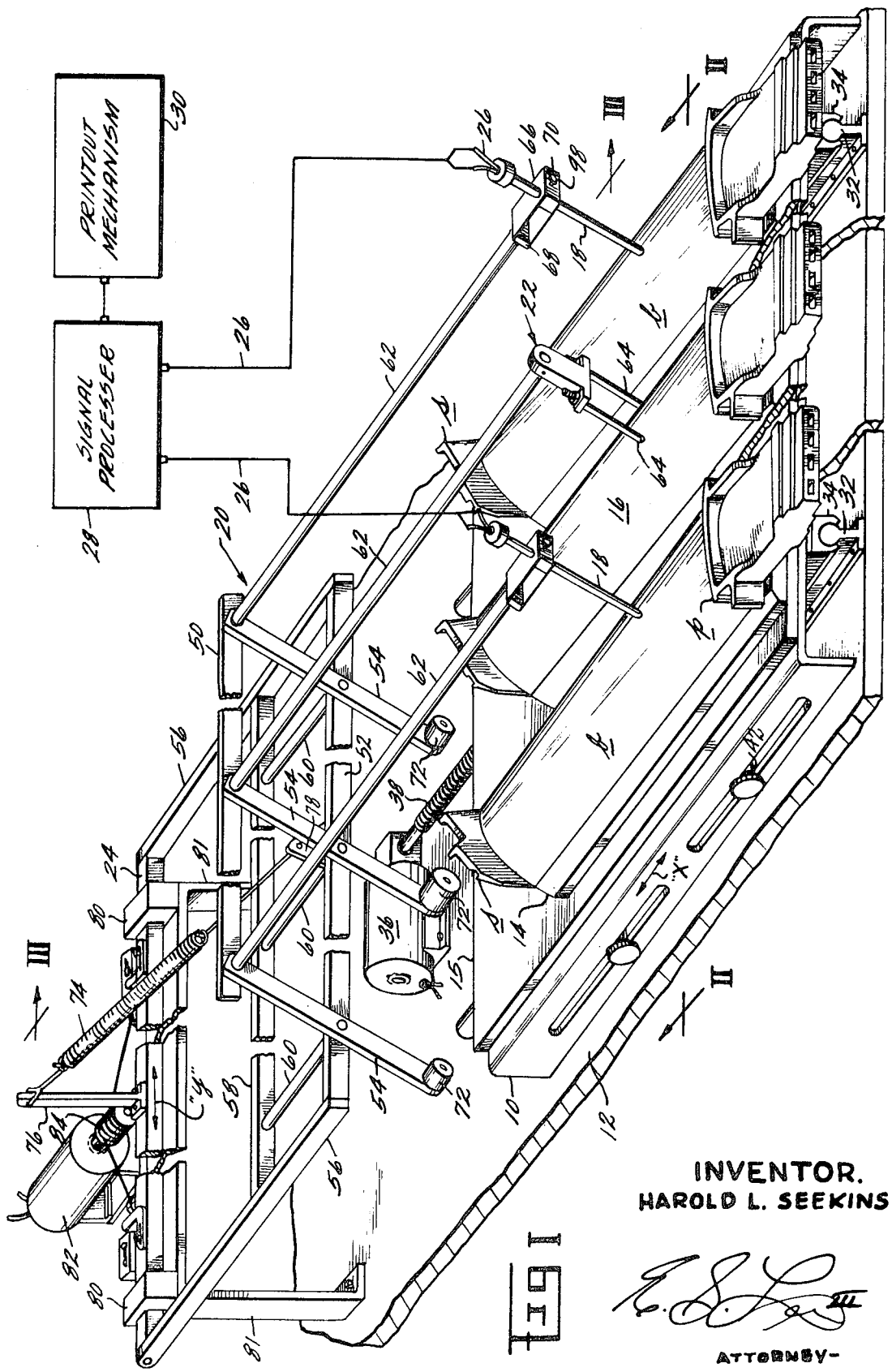

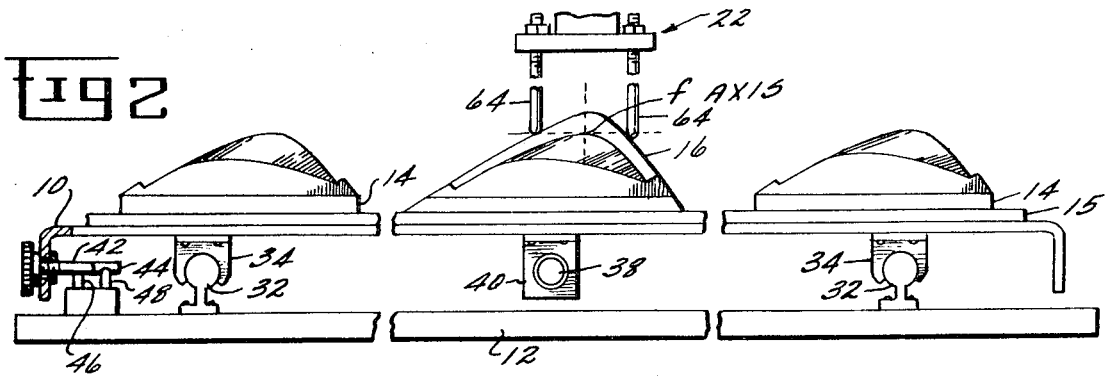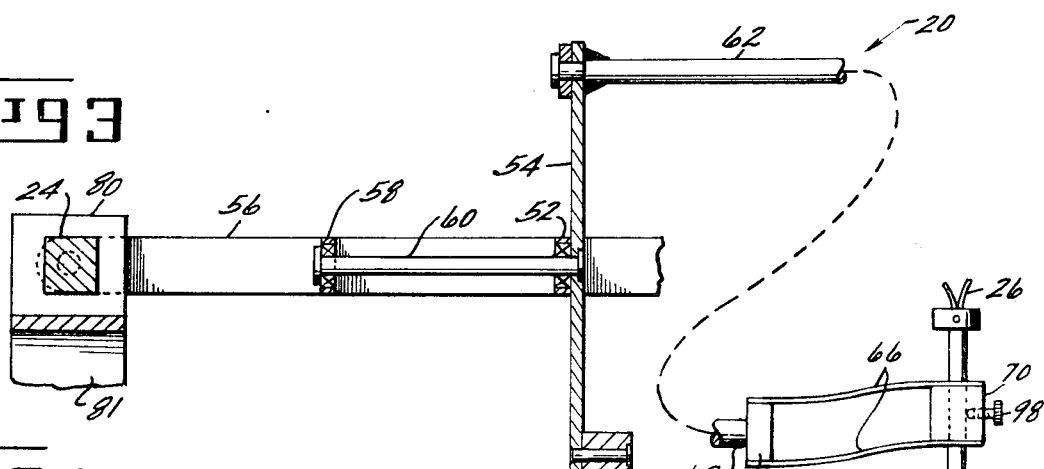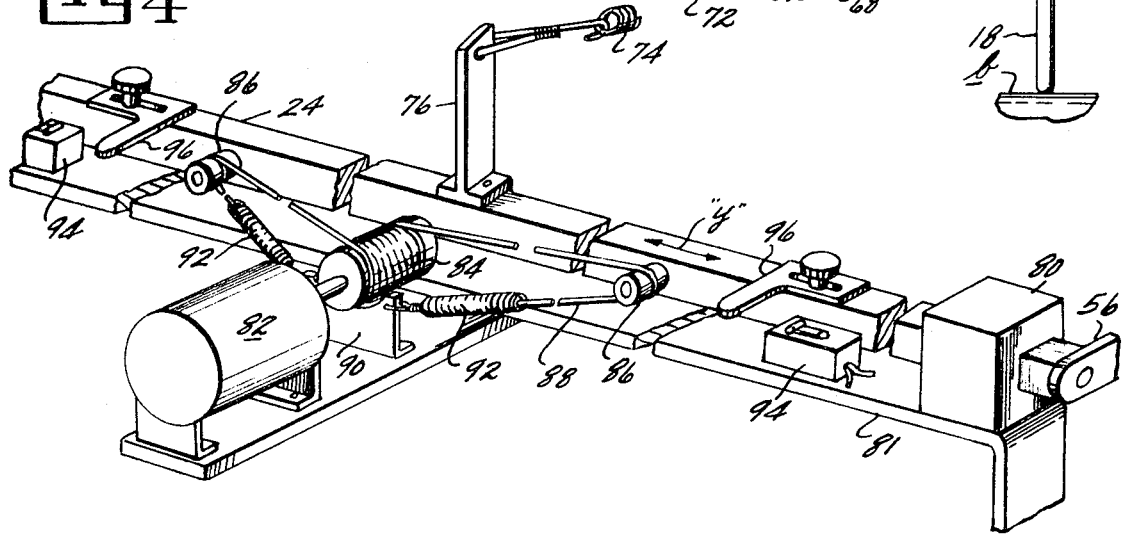

INSPECTION MACHINE USING A MASTER AND FOLLOWER TO GUIDE A PROBE AT A PREDETERMINED ANGLE RELATIVE TO A TEST PIECE

The present invention relates to improvements in inspection machines or the like.

The motivating environment for the present invention is in the inspection of cast turbine blades employed in high performance gas turbine engines. The critical function of such blades in engine operation requires that their structural integrity be assured during the manufacturing process.

The materials from which these blades are formed are prone to the problem of microshrinkage. This is a condition where material density is reduced by the formation of small voids during the casting process. This type of defect, if substantial in extent, requires scrapping of a blade. Generally speaking, microshrinkage cannot be detected by visual inspection nor by dye penetrant inspection, Micro-cracks in the surface of a blade are another type of defect that cannot be detected by these visual inspection techniques.

High performance turbine blades are generally formed as hollow shells. To assure structural integrity it is further necessary to determine that minimum wall thickness dimensions are maintained in the blade shell. Here again visual inspection will not detect this type of defect.

While there are several non-destructive inspection techniques for detecting subsurface defects, the eddy current technique is particularly effective in detecting microshrinkage and microcracks at the same frequency and power level. At a different frequency level, the eddy current technique can also detect thin wall conditions in the blade shell.

The problem, overcome by the present invention, is that of economically mechanizing blade inspection by the eddy current technique. For maximum detection capability it is necessary that the probe employed in the eddy current technique be maintained essentially normal to the surface of the blade as it is inspected. This is a challenge when one considers the contour or curvature of turbine blades. A further complicating factor is that many turbine blades have laterally projecting shroud segments at their tip ends as well as lateral platforms at their tang ends.

Accordingly, one object of the invention is to provide improved, simple and accurate means for the inspection of turbomachinery blades by the eddy current technique.

Another and broader object of the invention is to provide improved means for traversing the contoured surface of a workpiece with a device that maintains a predetermined angular relationship with the surface of the workpiece irrespective of its contour variations.

These ends are broadly attained by a machine comprising a contoured master and a workpiece holder in fixed relation thereto for positioning a correspondingly contoured workpiece. A follower engages the master and maintains a given angular relation to its surface irrespective of the specific contour of the point of engagement. A device is juxtapositioned relative to the workpiece at a point corresponding to the point the follower engages the master. Means are provided for maintaining a predetermined angular relationship between the follower and the device so that the latter maintains a predetermined angular relationship relative to the workpiece. By imparting relative movement in $x$ and $y$ horizontal directions, between the workpiece holder/master and the device/probe, the device may scan the workpiece while maintaining a fixed angular relation to the surface thereof.

Other features of the invention include mounting of the workpiece holder and master in side-by-side relation, employing a parallel linkage mechanism to maintain the device or eddy current probe in fixed angular relationship to the follower and providing for movement of the probe and follower in a vertical direction. Preferably the follower comprises a pair of equal length pins equispaced on opposite sides of the relatively fixed axes of the parallel linkage mechanism. Vertical movement of the probe and follower may be provided by pivoting the parallel linkage mechanism on a slide that is guided for movement in the $y$ direction. Independent vertical movement of the probe may be provided by a pair of vertically spaced resilient flex plates which function as a parallel linkage mechanism.

The above and other related objects and features of the invention will be apparent from a reading of the following description of the disclosure found in the accompanying drawings and the novelty thereof pointed out in the appended claims.

In the drawings:

FIG. 1 is a perspective view, with portions broken away, of an eddy current inspection machine embodying the present invention;

FIG. 2 is a fragmentary section taken on line II—II in FIG. 1;

FIG. 3 is a fragmentary section taken on line III—III in FIG. 1; and

FIG. 4 is a perspective view further illustrating a portion of the machine seen in FIG. 1.

The inspection machine, illustrated in the drawings, comprises a carriage 10 which is supported for reciprocating movement in an $x$ direction relative to a base member 12. A plurality of blade holders 14 are mounted on a plate 15 in side-by-side relation with a blade master 16. Test blades $b$ are mounted on the blade holders 14. An eddy current probe 18 is mounted above each blade $b$ from a parallel linkage mechanism 20. A follower 22 is also mounted from the parallel linkage mechanism 20 and bears against the master 16. The parallel linkage mechanism is pivotally mounted on a slide 24 which is supported for incremental movement in a $y$ direction relative to the base member 10.

The follower 22 controls the parallel linkage mechanism to maintain the probes 18 normal to the surfaces of the blades $b$ as they traverse the blades in the $x$ and $y$ directions. The probes 18 are connected by flexible leads 26 to a multichannel signal processor 28 which in turn controls a print-out mechanism 30. A visual record is thus provided for each blade inspected. The same machine can be employed to inspect the opposite concave surfaces of the blades $b$ by substituting appropriate holders and a concave blade master on the carriage. Alternatively, a separate machine could be set up to inspect the concave surfaces of the blades if production volume warranted it.

To give a detailed description of the elements briefly referred to above, reference will again be made to the carriage 10 (FIGS. 1 and 2). Guide rails 32, extending in the $x$ direction are mounted on the base 12 and support the carriage through sliding journal shoes 34 secured to the lower surface of the carriage. Movement in the $x$ direction is derived from a reversing electric motor 36, mounted on the base 12. A lead screw 38 is rotated by motor 36 within a fixed nut 40, mounted on the undersurface of the carriage 10, to advance and retract the carriage. Fingers 42, 44 are adjustably positioned along slots in a skirt 46 at one side of the carriage 10. The fingers 42, 44, respectively engage switches 46, 48, mounted on base 12, at the extremes of $x$ direction travel of the carriage 10. The switches 46 and 48 are connected to the reversing circuit of the motor 36 and engagement therewith reverses the direction of rotation of the motor 36 and thus reverses the direction of travel of the carriage 10. The fingers 42, 44 are adjustable for different length blades.

The parallel linkage mechanism 20 comprises an upper cross bar 50 connected to a relatively fixed bar 52 by a plurality of links 54. The bar 52 is secured to side bars 56 which are pivotally mounted on the slide 24. An auxiliary cross bar 58 also extends between the side bars 56. Parallel shafts 60, journaled in the bars 52 and 58, are respectively secured to the links 54 to provide the fixed axes of the parallel linkage mechanism. Parallel rods 62 are respectively secured to the upper ends of the links 54 with rearward extensions thereof being pivotally received by the upper cross bar 50. The rods 62 extend forwardly, in the $x$ direction, in overlying relation with the blade holders 14 and blade master 16 for a distance approximating the length of the longest blade contemplated for testing. The follower 22 is rigidly attached to the rod 62 which overlies the blade master 16 and comprises a pair of laterally spaced pins 64 projecting downwardly to engage the surface of the master 16. The probes 18 are mounted on the forward ends of the remaining rods 62 by way of flex plates 66 which extend, in vertically spaced relation between blocks 68, secured to rods 62, and probe holders 70. The flex plates 66 function as parallel linkages to maintain the probes in an essentially vertical plane normal to the blades $b$.

The parallel linkage mechanism is counterbalanced so that the follower 22 and probes 18 bear against the master 16 and blades $b$ with a minimum of pressure and also in order that a minimum force is required to angularly displace the parallel linkage mechanism. The latter end is attained by the lower extensions of the links 54 to which counterweights 72 are attached. The parallel linkage mechanism 20 is counterbalanced by a spring 74 extending between a post 76 secured to the slide 24 and a lug 78 secured to the cross bar 52. This spring minimizes the pressure exerted by the probes 18 on the blades $b$ and by the follower 22 on the master 16. It will also be noted that the spring 74 assists in raising the arms 56 to an elevated position where they may be latched to provide clearance for removing blades after inspection and then mounting a new set of blades on the holders 14.

The slide 24 is guided in blocks 80, on a U-bracket 81, for movement in the $y$ direction. A stepping motor 82, also mounted on the U-bracket 81, is provided with a spirally grooved drum 84. Grooved rolls 86 are journaled on the slide 24 parallel to the drum 84. A cord 88 is wound around the rolls 86 and drum 84 with its opposite ends anchored to a base bracket 90 through shock absorbing springs 92. The stepping motor is connected to the switches 46 and 48 and actuated thereby at each extreme movement of the carriage 10 to incrementally rotate the drum 84 and incrementally advance the slide 24 in the $y$ direction. Limit switches 94 are utilized to inactivate the motors 36 and 82 when the full surfaces of the blades have been fully traversed in both the $x$ and $y$ directions. These switches, mounted on the U-bracket 81, would be contacted by adjustable fingers 96, on the slide 24, to interrupt the electrical circuits to these motors at either extreme of movement in the $y$ direction. The motor 82 would preferably be a reversing motor as well so that the blades could be traversed from either side in the $y$ direction.

During operation the probes 18 traverse the blades $b$ in a lengthwise or $x$ direction starting at one side of the blades and then are incrementally indexed in the y direction toward the other side at each extreme of movement in the $x$ direction. The weight of the structure mounted on the pivoted bars 56 causes the fingers 64 (of follower 22) to bear against the surface of master 16 and thus control the angular position of the parallel linkage mechanism 20 and the probes 18 mounted thereon. The fixed axes ($f$) of the parallel linkage mechanism are in the plane of the pivot axis of the side bars 56 and the upper surfaces of the blades $b$ and master 16. The pins 64 are parallel to the probes 18, and are equidistant from the $f$ axis with their ends lying in a plane normal thereto. The counterbalancing spring 74 minimizes the gravity force of the probes 18 and fingers 64 on the blades $b$ and master 16, respectively, so that wear is minimized and yet sufficient pressure is provided for the fingers 64 to provide a torque force that will position the parallel linkage mechanism. The torque force is minimized and maintained essentially constant by the counterweights 72. The described arrangement maintains the probes 18 normal to the surfaces of the blades $b$ throughout their traverse of the changing curvature of such surfaces as viewed in the $x$ direction.

The curvature of the blades $b$, as well as twist in certain blades, result in height changes during traversing. These changes are accommodated by the pivotal connection of the side bars 56 to the slide 24. The desired normal relation, viewed in the $y$ direction, is substantially maintained by mounting the probes and follower at a substantial distance from the pivotal connection to the slide 24. The large radius reduces the arcuate travel of the probes to a minimal amount having no substantial angular change. To accommodate height variations between the master 16 and individual blades $b$, the flex plates 66 function as a resilient or spring loaded parallel linkage. The flex plates are formed of resilient material and, being relatively thin, may be deflected upwardly in parallel linkage fashion. The flex plates also regulate, in part, the pressure of the probes on the blades. Initially the probes are adjusted in the holders 70 and secured by screws 98 to slightly deflect the flex plates 66 and yieldingly urge the probes against the respective blades.

It will also be seen that the dependent mounting of the probes 18 from the rods 62 permits the full lengths of the blades $b$ to be traversed when they are provided with platforms $p$ at their inner ends and shroud segments $s$ at their outer ends. The rods 62 and flex plates also have a length equal to the length of the longest blade to be inspected for this same reason.

Another feature enabling full inspection of the blades is found in the provision of blade surface extensions on blade holders for tapered blades as illustrated. This permits the probes to ride on and off the tapered blade edges as they are traversed in the $x$ direction. Thus, there is no need to elaborately program the traversing function for this type of blade.

By thus maintaining the probes 18 normal to the blade surfaces, accurate read-outs are obtainable in inspecting the blades for irregularities conventionally within the capabilities of eddy current inspection. The type of signal processing equipment and print-out equipment could readily be determined by one skilled in the art to meet specific needs or requirements.

It will be apparent that the number of blades to be inspected at one time can vary widely for the particular needs of a given operation. Further, different plates 15 having appropriate holders and masters for different blade designs can readily be placed on the carriage 10 and automatically positioned thereby for the inspection function of either their convex or concave surfaces.

While reference herein has been to features for maintaining an eddy current inspection probe normal to a curved blade, it will be recognized that, in the broader aspects of the invention, other devices could be substituted for the probe and maintained at various fixed angular relationships relative to a curved workpiece. It is also to be understood that the described "normal" relationship may not be specifically precise at all times but the term "normal" is to include relationships that are essentially normal. The scope of the present inventive concepts is therefore to be derived solely from the following claims.

Having thus described the invention, what is claimed as novel and desired to be secured by Letters Patent of the United States is:

1. An inspection machine comprising means mounting a workpiece holder and a master, having a curved surface, in spaced relationship to each other in an $x-y$ plane that a workpiece correspondingly curved to the master may be positioned in the holder in fixed relation relative to the master;
    a follower for bearing against the master and assuming a predetermined angular position relative to the curved surface of the master at any point on the master independently of its curvature,
    a probe juxtapositioned relative to the workpiece at a point corresponding to the point the follower engages the master,
    means maintaining a parallel relationship between the probe and the follower whereby the probe will be maintained at the predetermined angular position relative to the surface of the workpiece,
    means for imparting relative linear movement to the mounting means and its associated workpiece holder/master in an $x$ direction,
    and means for imparting relative linear movement to the maintaining means and its associated probe/follower in a $y$ direction orthogonal to the $x$ direction whereby the surface of the master and workpiece may be traversed with the follower and probe respectively while the maintaining means preserves the predetermined fixed angular positions between the follower and master and between the probe and workpiece surface.

2. An inspection machine as in claim 1 wherein
    the $x-y$ plane is horizontal,
    the holder positions the workpiece in side-by-side relationship with the master relative to the $x$ direction,
    the means maintaining a parallel relationship between the probe and follower include a parallel linkage mechanism and further wherein
    means are provided for vertical movement of the probe and follower in a direction generally orthogonal to the $x\,y$ plane to accommodate height variations of the workpiece and master.

3. An inspection machine as in claim 2 wherein the means for imparting relative linear movement to the mounting means and its associated workpiece/master in the $x$ direction comprise
    a carriage on which the master and holder are mounted and means for reciprocating the carriage in the $x$ direction and
    wherein the means for imparting relative linear movement to the maintaining means and its associated probe/follower in the $y$ direction comprise
    a slide movable in the $y$ direction to which the parallel linkage mechanism is connected and means for incrementally advancing said slide in the $y$ direction at each extreme of reciprocating movement of the carriage.

4. An inspection machine as in claim 3 wherein the parallel linkage mechanism is pivotally connected to the slide about an axis extending in the $y$ direction to provide said vertical movement of the follower and probe and further wherein
    means are provided for independent vertical movement of the probe to provide for height differentials between the workpiece and master.

5. An inspection machine as in claim 2 wherein
    the follower comprises a pair of pins spaced apart in the $y$ direction and engaging the master at a predetermined angular position for controlling the angular position of the probe relative to the workpiece surface through the parallel linkage mechanism and
    the master has extensions beyond the workpiece outline of a curvature which when engaged by the pins of the follower operates to maintain the predetermined angular position of the probe relative to the workpiece surfaces up to the extremities of the workpiece outline.

6. An Eddy current inspection machine comprising
    means mounting a blade holder and a curved blade master in fixed spaced relationship to each other in an $x-y$ plane so that a test blade correspondingly curved to the master may be positioned in the blade holder in fixed relation relative to the master,
    a follower for bearing against the master and assuming a position normal to the curved surface of the master at any point on the master independently of its curvature,
    a signal generating probe bearing against the test blade at a point corresponding to the point the follower engages the master,
    means maintaining a parallel relationship between the probe and follower whereby the probe will be maintained normal to the surface of the test blade,
    means for imparting relative linear movement to the mounting means and its associated blade holder/master in an $x$ direction,
    and means for imparting relative linear movement to the maintaining means and its associated probe/follower in a $y$ direction orthogonal to the $x$ direction whereby the surface of the master and test blade may be traversed with the follower and probe respectively while the maintaining means preserves the normal orientations between the follower and master and between the probe and test blade surface.

7. An Eddy current inspection machine as in claim 6 wherein
the mounting means include means for mounting the blade holder and the blade master in side-by-side relationship relative to the x direction and
the means maintaining a parallel relationship between the probe and the follower comprise a parallel linkage mechanism including at least two spaced apart parallel rods extending in the x direction from the follower and probe respectively into rotatable connections in an upper crossbar which extends in the y direction with the rotatable connections permitting rotation of the rods about the x direction and further including a lower relatively fixed bar also extending in the y direction with parallel links fixedly connected at one end to the parallel rods and rotatably pinned at the other end to the lower fixed bar at spaced apart fixed axes extending in the x direction.

8. An Eddy current inspection machine as in claim 7 wherein
the follower comprises a pair of pins equispaced in the y direction on opposite sides of the fixed axis to which it is attached by way of the interconnecting rod and link said pins engaging the curved surface of the master and controlling the angular position of the parallel linkage mechanism, and
the master has extensions outside the test blade outline, of a curvature which when engaged by the pins of the follower operates to maintain the relationship of the probe normal relative to the surface of the test blade up to the extremities of the test blade outline.

9. An Eddy current inspection machine as in claim 8 wherein
the fixed axes of the parallel linkage mechanism lie generally in a plane through the blade master
the probe and follower are connected to the parallel linkage mechanism above the fixed axes by the rods which have a length approximating the length of the test blade and master, said probe and follower projecting downwardly therefrom to respectively engage the test blade surface and master surface
the means for imparting x movement comprise a carriage on which the master and holder are mounted, and means for reciprocating the carriage in the x direction, and
the means for imparting y movement comprise a slide movable in the y direction on which the parallel linkage mechanism is mounted and means for incrementally advancing said slide in the y direction at each extreme of reciprocating movement of the carriage and further wherein
the parallel linkage mechanism is pivotally mounted on the slide about a y extending axis lying in the plane of the fixed axes of the parallel linkage mechanism.

10. An eddy current inspection machine as in claim 9 wherein
the probe is mounted by a pair of flex plates which are spaced apart in parallel relation normal to the axis of the probe and clamped at their opposite ends to provide a resilient, flexible parallel linkage connection permitting independent heightwise variations of the probe relative to the follower while resiliently mounting engagement with the blade surface.

11. An Eddy current inspection machine as in claim 7 wherein each link extends downward from the spaced apart fixed axes into attachment with a counterweight so as to minimize and maintain essentially constant the torque force.

* * * * *